United States Patent
Ponomarenko et al.

[11] Patent Number: 5,804,070
[45] Date of Patent: Sep. 8, 1998

[54] FILTER PRESS FOR FILTERING SUSPENSIONS, ESPECIALLY SEWAGE SLUDGE

[75] Inventors: Viktor Germanowitsch Ponomarenko; Valeri Fjodorowitsch Pawlenko; Viktor Anatoljewitsch Tschernikow; Oleksandr Fjodorowitsch Pitschachtschi; Oleksandr Viktorowitsch Stankun; Viktor Michailowitsch Gutorow, all of Charkow, Ukraine

[73] Assignee: Eberhard Hoesch & Soehne GmbH, Alsdorf, Germany

[21] Appl. No.: 820,774

[22] Filed: Mar. 18, 1997

Related U.S. Application Data

[63] Continuation-in-part of Ser. No. 574,626, Dec. 19, 1995, abandoned.

[30] Foreign Application Priority Data

Dec. 22, 1994 [UA] Ukraine ................... 94 128151

[51] Int. Cl.⁶ .................................................. B01D 25/38
[52] U.S. Cl. .......................... 210/225; 210/229; 210/409
[58] Field of Search ................................... 210/224, 225, 210/227, 229, 230, 407, 409; 100/198, 199, 200

[56] References Cited

U.S. PATENT DOCUMENTS 3,613,563  10/1971  Meshengisser et al. .
4,155,830   5/1979  Sukhobrosov et al. .

FOREIGN PATENT DOCUMENTS

| 0164482 | 12/1985 | European Pat. Off. . |
| 1450828 | 7/1966 | France . |
| 55-49114 | 4/1980 | Japan . |
| 148018 | 9/1966 | Russian Federation . |
| 285687 | 3/1972 | Russian Federation . |
| 613776 | 7/1978 | Russian Federation . |
| 2114908 | 9/1983 | United Kingdom . |

*Primary Examiner*—Matthew O. Savage
*Attorney, Agent, or Firm*—W. F. Fasse; W. G. Fasse

[57] ABSTRACT

A filter press for the filtration of suspensions has a frame, a support plate (1), a pressure plate (2) mounted in the frame and a set of vertically arranged filter plates (4) between the support plate (1) and the pressure plate (2). The filter plate (4) is provided with a single layer filter fabric (8) on the side that removes the liquid and collects the solids. The filter fabric runs over two filter cake removal rollers (6, 7) that are so positioned relative to each other and relative to the fabric (8) that an S-configuration is imposed on the filter fabric (8) as the rollers travel along the fabric. A pressure application device (5) presses the filter plates (4) together. A cleaning pipe (17) with spray nozzles (17A) for cleaning the filter fabric (8) is positioned between the cake removal rollers. The single layer fabric reduces the filtering resistance, thereby increasing the capacity of the filter press. The lower and upper edges of the filter fabric are secured to the respective edges of the filter plate. The cake removal rollers (6, 7) are moved up and down by a lifter (H).

21 Claims, 5 Drawing Sheets

FILTER PRESS FOR FILTERING SUSPENSIONS, ESPECIALLY SEWAGE SLUDGE

CROSS-REFERENCE TO RELATED APPLICATION

This application is a Continuation-In-Part of our application U. S. Ser. No. 08/574,626; filed Dec. 19, 1995, now abandoned.

FIELD OF THE INVENTION

The invention relates to a filter press for filtering suspensions which have a filterability within the range of medium difficulty to a filterability that is too difficult for conventional filter presses. Sewage sludge is just one example of such a suspension.

BACKGROUND INFORMATION

Filter presses for the above purpose are constructed with a press frame with upright and vertical frame members holding a stationary vertically oriented support plate and a horizontally movable also vertically oriented compression plate. A set of vertically extending filter plates is arranged between the support plate and the compression plate. Each filter plate is equipped with a filtering screen such as a filter fabric arranged on that side of the respective filter plate from which liquid or filtrate is removed. The filter screen or fabric runs over two rollers cooperating with a mechanism for the removal of filter cake from the filter fabric. Further, such filter presses are normally equipped with a device for regenerating or cleaning the filter fabric. Japanese Patent Publication 55-49114, (Kubota et al.), published on Apr. 9, 1980, discloses a filter press as just described. This Japanese publication mentions that the "tensile strength of filter cloth 12 can be adjusted and filter cloth 12 can be readily removed." Tensile strength adjusters are not disclosed.

Soviet Inventor's Certificate Number 148018, IPK B01 D 25/12 discloses a filter press of the type described above. Such a filter press is used, for example for dehydrating sewage sludge and other liquid hydrogenated systems in the chemical industry and related industrial applications. The filter press in the just mentioned publication is equipped with the above mentioned components and the filter fabric is constructed or sewn as an endless belt that runs over the rollers for the removal of the filter cake. For this purpose, the endless filter fabric belt moves, driven by a belt drive, relative to the support and compression plates. The known filter press also includes a mechanism for operating the compression plate to thereby press the filter plates together. Such a filter press has a high efficacy, however with the disadvantage that due to the special construction it is not possible to realize filter surface areas larger than about 25 to 32 $m^2$. Such a limitation substantially reduces the usefulness of the just described filter press, especially with regard to different types of applications.

Soviet Inventor's Certificate 285687 IPK B01 D29/04, corresponding to U.S. Pat. No. 3,613,563 (Meskengisser et al.), issued on Oct. 19, 1971, discloses another filter press which comprises the above mentioned components, however, with a modification in the transport mechanism for the filter fabric. Instead of transporting the endless filter fabric belt over rollers, a mechanism is provided for shifting the filter plates, whereby the removal of the filter cake takes place by a sequential shifting of the filter plate from one filter package into the other. This motion of the filter plates clamps the endless filter fabric between two neighboring plates. Due to this sequential clamping an effect is obtained which moves the filter fabric along the filter plates, thereby loosening the filter cake from the fabric. The cake is removed in the same manner as in the first mentioned filter press by the contact between the filter fabric and the rollers of small diameter mounted to each filter plate.

Due to the vertical arrangement of the plates in the just mentioned filter press, this type of press provides a filtering surface area of up to 100 $m^2$ and possibly more. However, such a construction has the disadvantage that it is not possible to prevent the filter fabric from travelling sideways to one or the other plate edge, whereby the fabric can travel sideways to such an extent that even after a short time of operation of the filter press the filter fabric can leave the edge of the filtering surface of the filter plates entirely. In order to prevent this, a manual control of the filter fabric position in the filter press is necessary.

Another drawback of the just described filter press is seen in that due to its special construction the filtering takes place through two filter fabric layers which reduces the productivity of the known filter press substantially. One reason for such a productivity reduction is due to the fact that the filtering resistance of two layers that must be penetrated by the liquid component of the suspension to be filtered is larger than the filtering resistance of but one filtering layer. Another reason is seen in that there is no practical possibility of removing contaminations that get caught between the two filter fabric layers after the contaminations have passed the first layer. Contaminations caught between the two filter fabric layers further increase the filtering resistance.

Yet another disadvantage of the just mentioned type of filter press is seen in the reduction of the productivity due to the unproductive time needed for the removal of the filter cake. The removal of the filter cake requires the sequential operation of the filter plates which is cumbersome and time consuming.

Soviet Inventor's Certificate 613776, IPK BO1D 25/12 discloses a filter press so constructed that it provides an increased filtering surface area of up to 100 $m^2$ and more. Such a filter press comprises a frame with a clamping mechanism, a support and a compression plate arranged vertically with a set of filter plates therebetween. Two rollers are mounted to each filter plate and the filter fabric travels over these rollers. The filter fabric is then moved relative to the filter plates for removing the filter cake. For this purpose the filter fabric is formed as an endless loop individually for each filter plate. The endless loop travels over the rollers arranged at the upper and lower edge or end of the respective filter plate. A special entraining member is secured horizontally to the filter fabric of each filter plate. The ends of the entraining member extend outside the width of the fabric web. In order to remove the filter cake, the just mentioned entraining members are moved downwardly, whereby the fabric carrying the filter cake is caused to continuously detour at the rollers, whereby the filter cake is loosened at the lower roller. After removal of the filter cake, the entraining members return the respective filter fabric loop into its starting position, whereupon the filtering cycle can be repeated.

Such a construction of the filter press as just described substantially reduces the time needed for the removal of the filter cake compared to the different types of cake removal described above. The cake removal is more efficient because all filter plates move away from each other simultaneously at the beginning of the transport motion of the filter fabric loop. However, the filtration takes place in the same manner as described above through two filter fabric layers, whereby the same disadvantages occur, namely an increase in the filtering resistance, a reduction in the productivity, and there is no practical possibility of regenerating the filter fabric with regard to contaminations entrapped between the two filter fabric layers. Further, the consumption of filter fabric is unnecessarily doubled, whereby the costs for this increased consumption of filter fabric are substantial because they amount up to one third or more of the entire operational costs.

Another problem with the last mentioned filter press involves the tensioning of the filter fabric during the work stroke of the entraining members. The filter cake is positioned on fabric sections below the entraining members, which means that the filter cake is on the relaxed run of the endless filter fabric loop drive. This fact poses certain difficulties with regard to an effective removal of the filter cake from the fabric.

OBJECTS OF THE INVENTION

In view of the above it is the aim of the invention to achieve the following objects singly or in combination:

to improve a filter press of the type described above in such a way that an efficient, simultaneous, and reliable filter cake removal is assured for all filter plates of a press;

to increase the productivity and efficiency of a filter press, especially by reducing down times and improving the cleaning of the filter fabric for repeated use;

to substantially reduce the consumption of filter fabric to thereby decrease the costs of operation;

to use a single layer filter fabric instead of a two layer filter fabric to avoid the entrapment of contaminations between the two fabric layers and to use up less filter fabric;

to provide an effective detouring of the filter fabric for reliably removing filter cake by moving all filter cake removing devices in synchronism with each other for all filter plates of the filter press;

to use two filter cake removal rollers over which the filter fabric for the respective filter plate runs in an S-configuration;

to make the on-center spacing between two filter cake removal rollers adjustable to form different S-configurations for different types of filter cakes;

to provide an efficient cleaning of the filter fabric between the filter cake removal rollers; and to maintain the filter fabric elastically taut.

SUMMARY OF THE INVENTION

The foregoing objects have been achieved in a filter press according to the invention, wherein for each single layer filter fabric two filter cake removal rollers are arranged as a pair so that each roller is in contact with the respective surface of the single layer filter fabric of the corresponding filter plate, wherein the single layer filter fabric forms a belt that is guided into an S-configuration by the two rollers of the pair, wherein the ends of the single layer filter fabric are secured at the upper and lower edge of the respective filter plate, whereby preferably at least one filter fabric edge, preferably the upper edge, is suspended or supported by elastic elements. The filter cake removal rollers are connected to a lifting mechanism for a vertical displacement of the rollers relative to the filter fabric, whereby the rollers in combination with the lifting mechanism form a filter cake removal device, all elements of which operate simultaneously and in synchronism with each other for all filter plates in the filter press.

The filter press according to the invention makes it possible, by using a single layer filter fabric instead of a two layer filter fabric, to substantially increase the productivity of the filter press since the hydraulic resistance is substantially reduced. During filter cake removal a continuous S- or a zig-zag configuration detouring is imposed on the filter fabric covered with filter cake, whereby the filter cake is broken up sequentially and removed. Thus, it is now possible with the filter press according to the invention to achieve an extraordinarily reliable cake removal even of filter cakes that strongly adhere to the filter fabric. Due to the use of a single layer filter fabric, it is now possible to very effectively regenerate or clean the filter fabric during the operation of the filter press, more specifically during the return run of the filter cake removal rollers into a starting position for the next filter cake removal run. Furthermore, the consumption of filter fabric is substantially reduced in a filter press according to the invention.

According to a preferred embodiment of the invention two filter cake removal rollers are combined as a unit including two lifting carriages forming a pair. Two roller ends are mounted in each lifting carriage of the pair and the filter fabric of the respective filter plate runs over these two rollers, which are mounted rotatably relative to the lifting carriages. This construction substantially simplifies the guiding of the two rollers, the connection of the rollers to the lifting mechanism, and the synchronous motion of all filter cake removal units during the filter cake removal and filter fabric cleaning. Preferably, a cleaning pipe with spray nozzles is also mounted with each pipe end in one of the two carriages forming a pair so that the cleaning pipe is positioned between the two rollers.

In a further preferred embodiment of the filter press according to the invention the upper end or edge of the filter fabric of each filter plate is mounted by an elastic fabric tensioning mechanism positioned in an upper area or portion of the filter plate or just above the filter plate proper. During the motion the filter cake removal rollers as driven by the lifting mechanism, a relaxing of the filter fabric takes place downstream of the position of the rollers as viewed in the roller travel direction during cake break-up removal. Specifically, the relaxing takes place above the rollers before the rollers reach their uppermost position. The just mentioned elastic tensioning mechanism compensates for such relaxing by upwardly displacing the upper edge of the filter fabric in an elastic manner so that the tension of the filter fabric is maintained substantially constant during the entire filter cake removal operation.

In the above mentioned embodiment of the invention, wherein the lifting carriages carrying the filter cake removal rollers also carry the cleaning pipe with its spraying nozzles, it is preferred that the spraying nozzles are directed onto that filter fabric surface, which carried the filter cake. In this manner a very simple, yet thorough regeneration or cleaning of the filter fabric is achieved. Further, the cleaning or regeneration of the filter fabric can take place on the synchronous return run of the lifting carriages into the starting position whereby an efficient use is made of the time that is needed anyway for the return run of the removal rollers and no extra time is required for the cleaning operation. This feature of the invention further increases the productivity of the present filter press.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
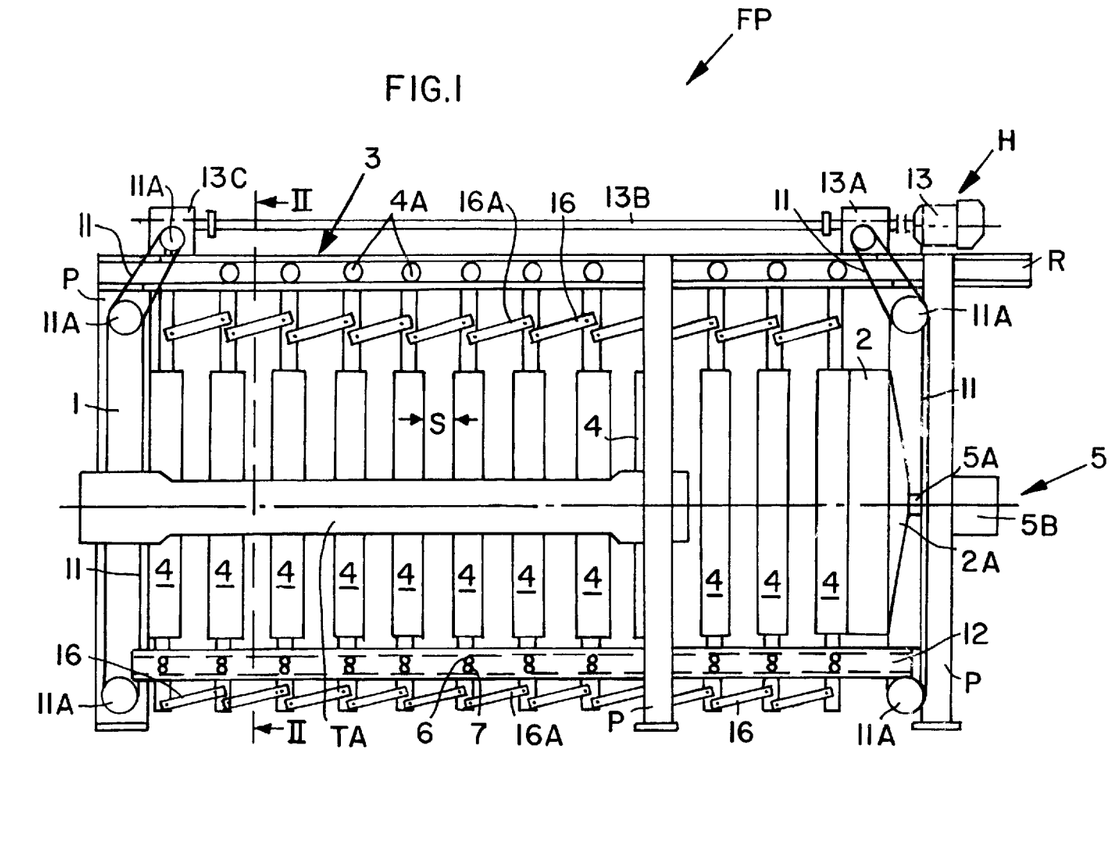
FIG. 1 shows an elevational, schematic side view of a filter press according to the invention with filter plates in a press-open position and filter cake removal rollers in a lower starting position.
Figures 3, 3A, 4, 5, 6:
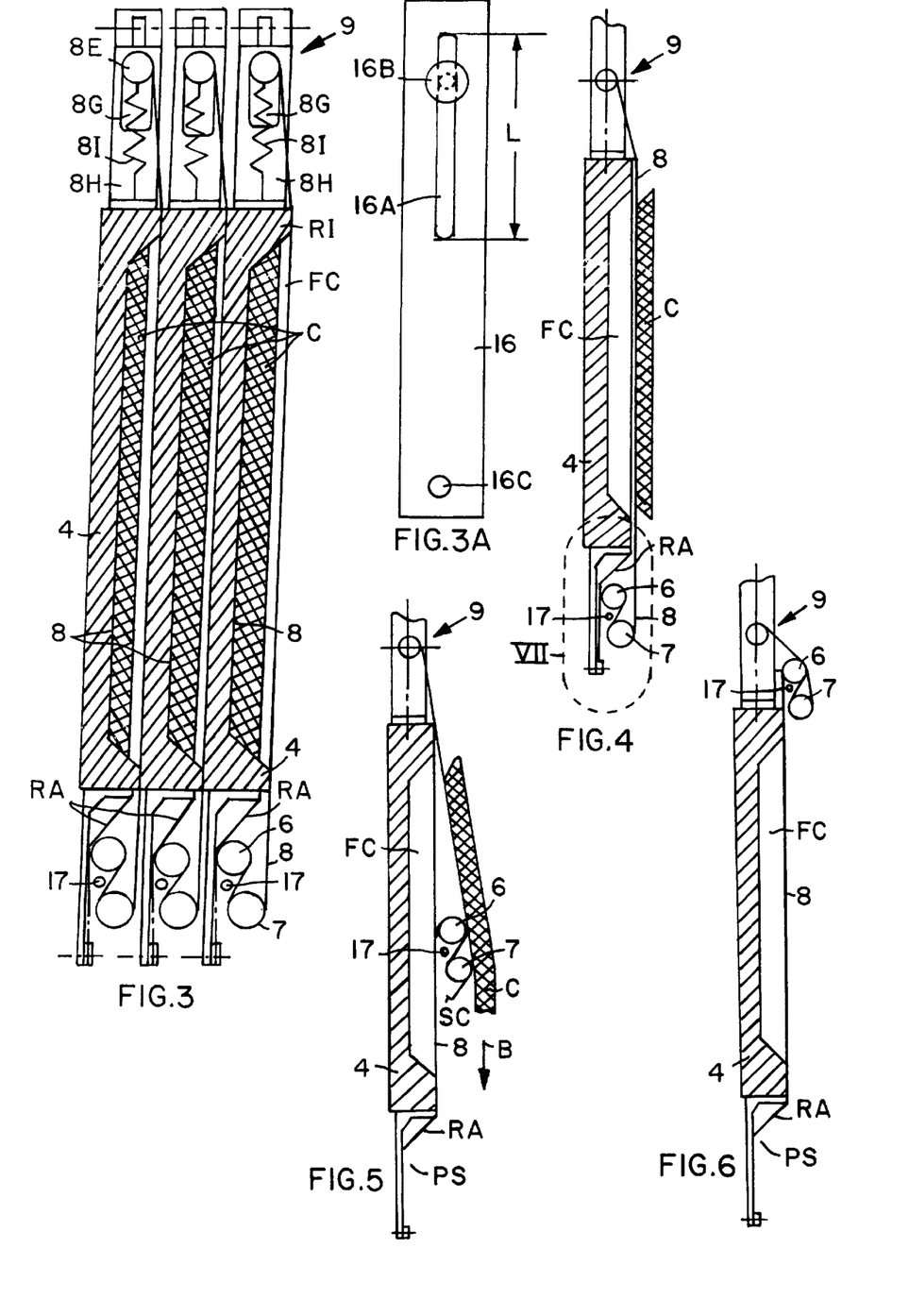
FIG. 3 shows three filter plates as part of a filter plate package in the pressed-together state during the filtration process while a filter cake is being formed on the respective filter fabric in each filter plate.
FIG. 3A is a side view on an enlarged scale compared to FIG. 1, of a spacer link for linking neighboring filter plates to each other.
FIG. 4 shows an open filter plate at the beginning of a filter cake removal with the cake removal rollers in their starting position.
FIG. 5 shows the cake removal rollers in a halfway position along their upward travel during a filter cake removal.
FIG. 6 shows the filter cake removal rollers in their uppermost position with the cake removed.

FIG. 1 shows the present filter press FP with a press frame 3 including upright posts P and horizontal rails R including horizontal tension anchors TA for distributing loads particularly tension loads, in the press frame 3. The filter press further comprises a load take-up or counter plate 1, a compression plate 2, also simply referred to as pressure plate, and a plurality of filter plates 4. All plates 1, 2, and 4 are arranged to extend vertically with the filter plates 4 positioned between the counter plate 1 and the pressure plate 2 in the frame 3. A compression mechanism 5 including for example a piston rod 5A and cylinder 5B is mounted in the frame 3 and connected with the piston rod 5A to a pressure distribution plate 2A which is connected to or forms part of the pressure plate 2. As shown, all filter plates 4 are in a position showing the largest possible spacing S between neighboring filter plates 4 which can be compressed so that the plates 4 contact each other. For this purpose all filter plates 4 are interconnected as a chain by spacer links 16, one of which is shown in FIG. 3A. Each link 16 has an elongated hole 16A through which a screw 16B e.g. with a flanged head or the like extends for movably securing the link 16 to one of two neighboring plates 4. A pivoting or journalling connector 16C secures the other end of the link 16 to the next plate of two neighboring plates 4, whereby the length L of the elongated hole 16A determines the maximum spacing S when the press is open with the plates 4 spaced from each other as shown in FIG. 1. The hole length L and thus the spacing S will be at least sufficient for the removal of filter cake as will be described in more detail below. Thus, the holes 16A permit pushing the filter plates 4 toward and away from each other and also limit the extent to which the filter plates may be moved apart to form the filter cake removal spacing S.

Figure 2:
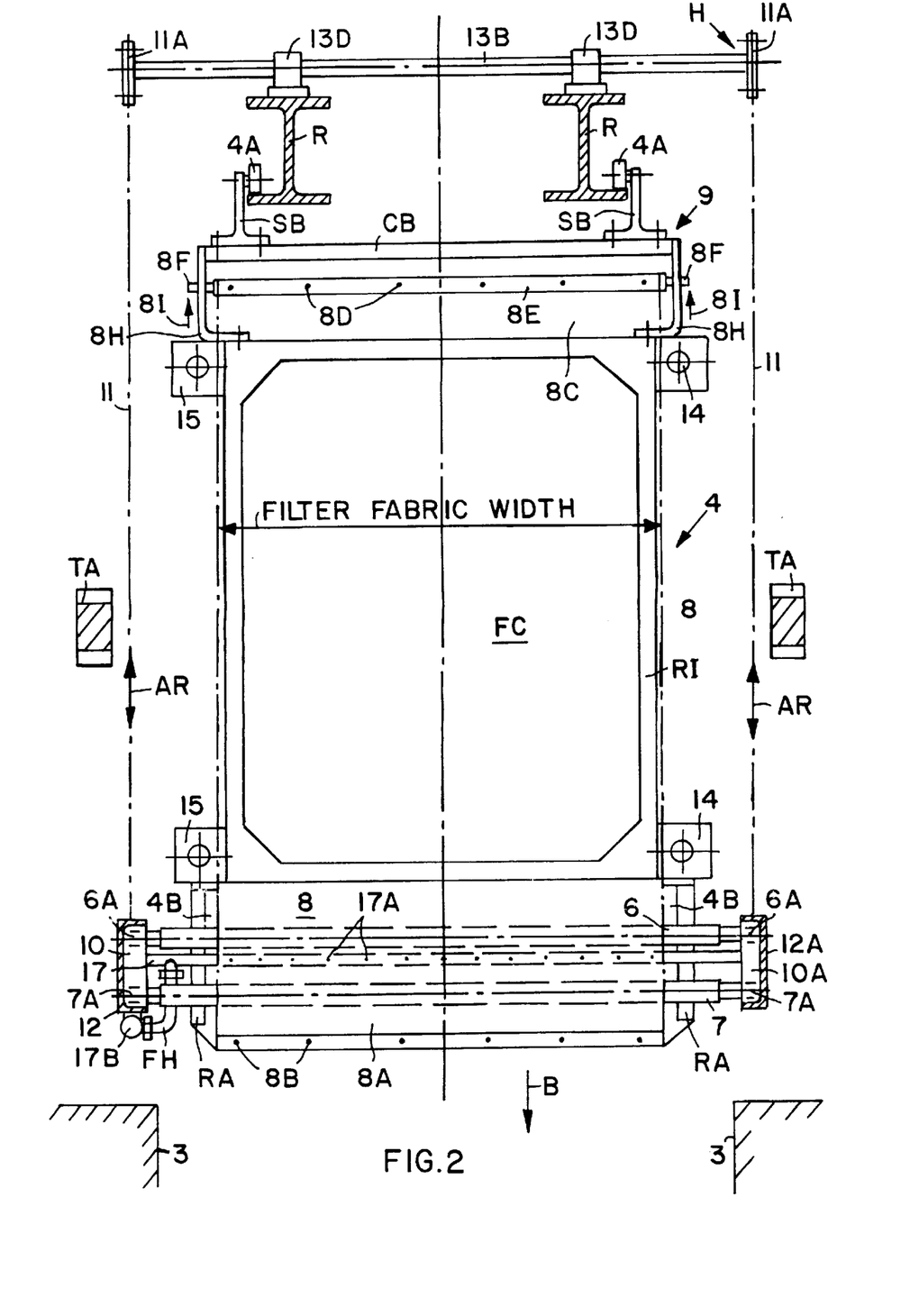
FIG. 2 shows a view in the direction of the arrows II—II in FIG. 1, illustrating a filter plate with a filter fabric, the filter cake removal rollers, and a fabric tensioning mechanism.

FIGS. 1 and 2 also show filter cake removal and rollers 6, 7 held or mounted in lifting rails 12, 12A which in turn are guided in the frame 3 for a vertical up or down movement driven by a lifting mechanism H including a drive motor 13 mounted to the frame 3, a gear 13A, a transmission shaft 13B, a further gear 13C, and chain drives 11 with sprocket wheels 11A. The operation of the lifting mechanism H will be described in more detail below.

Filter plate guide rollers 4A shown in FIG. 2 run horizontally back and forth on horizontal frame rails R which support and guide the filter plates 4 as best seen in FIG. 2.

Figures 7, 8:
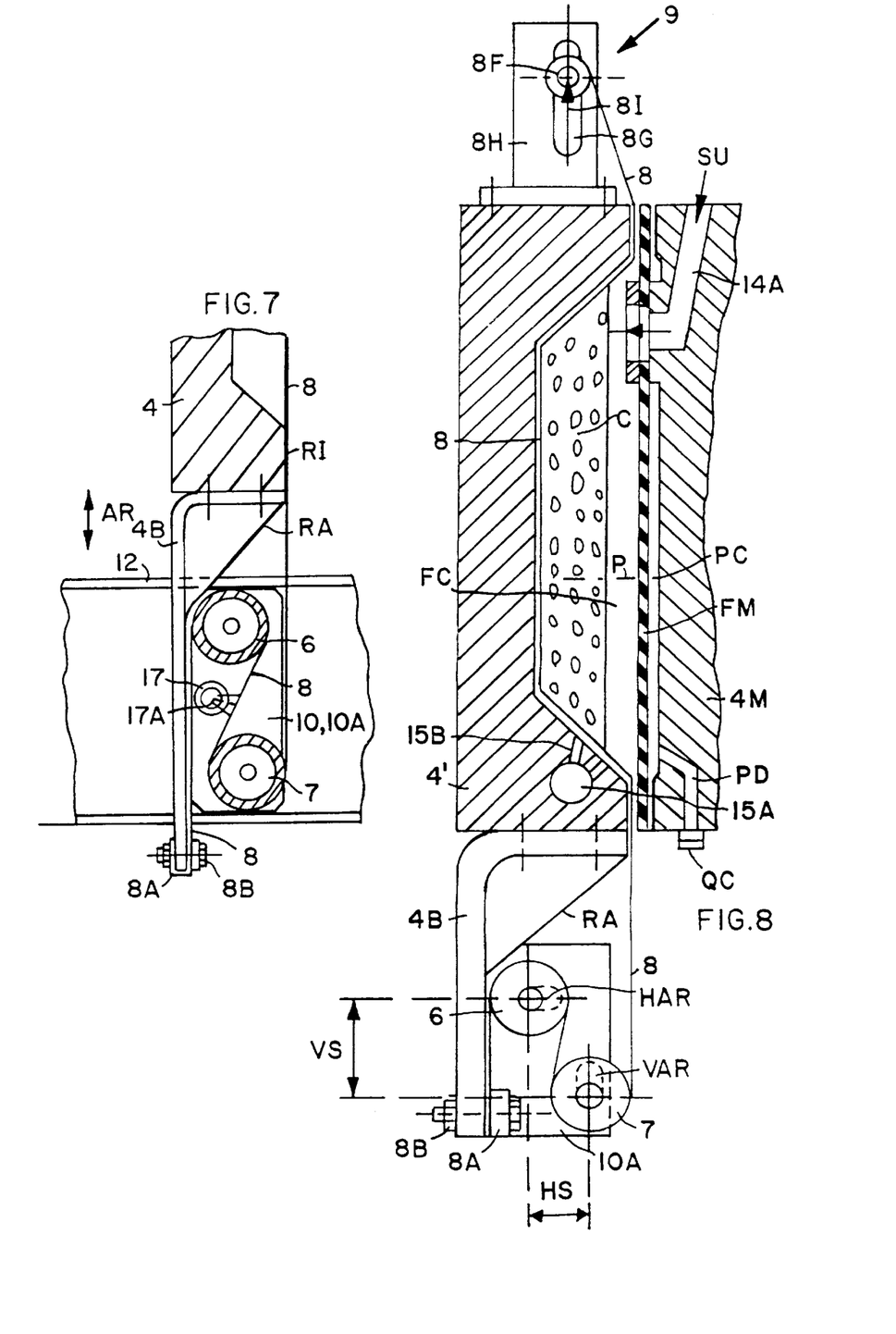
FIG. 7 shows on an enlarged scale a detail enclosed by a dashed line VII in FIG. 4 showing the position of a cleaning pipe between two filter cake removal rollers supported by a roller lifting carriage at each end of the rollers, with the shown carriage mounted in a lifting rail.
FIG. 8 is a sectional view through a pair of filter plates in their closed condition illustrating an inlet for suspension into a filtering chamber and a filtrate outlet for the filtering chamber formed between the two plates of a pair.

FIGS. 1, 2 and 3 show that each filter plate 4 is equipped with two of the above mentioned filter cake removal rollers 6 and 7. A filter fabric 8 for each plate 4 loops around the respective pair of rollers 6 and 7 in an S-configuration or an inverted S-configuration as shown in FIGS. 3 and 7. The filter fabric 8 is held at its upper edge by an elastic tensioning mechanism 9. Two of the rollers 6 and 7 forming a pair are rotatably mounted in a pair of lifting carriages 10, 10A which in turn are mounted and guided in the respective lifting rails 12, 12A.

As shown in FIGS. 2 and 3 and more specifically in FIG. 7, a lower edge 8A of the filter fabric 8 is rigidly secured to a mounting bracket 4B secured to the lower edge of the respective filter plate 4. The connection is, for example accomplished by screws 8B provided with suitable washers or a molding that functions as a washer for all screws 8B. An upper end 8C of the filter fabric 8 is similarly secured by screws 8D or the like to a tensioning bar 8E. Ends 8F of the tensioning bar 8E are guided in elongated holes 8G of filter plate suspension brackets 8H. One or more compression springs 8I elastically urge the tensioning bar 8E upwardly for keeping the respective filter fabric 8 taut. The springs 8I are only shown symbolically as upwardly pointing arrows in FIG. 2. The just described elements together form an elastic tensioning mechanism 9.

Referring further to FIG. 2, the filter plate suspension brackets 8H are interconnected at their upper ends by a cross-bar CB which in turn carries suspension brackets SB to which the above mentioned rollers 4A are secured in a rotatable manner for riding on the rails R that form part of the press frame 3.

Referring to FIGS. 1 and 2 in conjunction, the lifting mechanism H permits a vertical displacement of the guide and lifting rails 12 and 12A carrying the lifting carriages 10 and 10A respectively in which the filter cake removal rollers 6 and 7 are rotatably mounted. Either the roller ends 6A and 7A are rotatably mounted in bearings in the carriages 10, 10A or the rollers 6 and 7 are rotatably mounted on axles, the ends of which are rigidly secured in the carriages 10, 10A. A lifting operation displaces the rollers 6 and 7 as will be described in more detail below with reference to FIGS. 4, 5 and 6. The guide and lifting rails 12, 12A preferably extend horizontally along the entire length of the filter plates 4 in their extended or spaced condition as shown in FIG. 1. The rails 12, 12A are guided in the press frame 3 for the vertical up and down movement and are lifted and lowered by the operation of the lifting mechanism H with the drive chains 11 and respective sprockets 11A shown in FIG. 1. These drive transmission elements are operated by the drive motor 13 which is a reversible motor for the lifting or lowering operation. The guiding of the rails 12, 12A in the press frame 3 is such that a slight horizontal displacement at the beginning of an upward movement and at the end of a downward movement is possible for the carriages 10, 10A to move out of or return into the parking position shown in FIGS. 3, 4 and 7.

Referring further to FIGS. 2 and 3, each filter plate 4 is equipped with a filter chamber FC surrounded by a rim RI having a flat surface facing a neighboring filter plate 4. The filter fabric 8 has a width that is slightly wider than the horizontal width of the filter plate so that the edges of the filter fabric 8 will be clamped between the rim RI and the back surface or similar rim of a neighboring filter plate 4. Further, each filter plate 4 is equipped with one or more filling inlets 14 also referred to as collectors for feeding suspension to be filtered into the filter chambers FC when the plates forming a package are in the closed condition as shown in FIG. 3. The filling inlets 14 are interconnected by a suitable conduit which may, for example be a flexible hose, channel, duct, or the like. Each filter plate is further equipped with one or more discharge ports or outlets 15 for the removal of the filtrate. All the filling inlets 14 may be connected in series with each other to a supply pipe or hose for the suspension to be filtered. Similarly, all discharge ports 15 may be connected in series to a discharge hose or the like. However, it is also possible to connect the inlets through respective individual hoses to a supply pipe or hose or the like in parallel so to speak. Similarly, the discharge ports 15 for the filtrate may be connected by individual hoses to a discharge pipe or hose.

Referring to FIGS. 2, 3 and 4 in conjunction, a ramp RA connected to the bracket 4B makes sure that the rollers 6, 7 with their carriages 10, 10A can travel from the parking position below the respective filter plate 4 shown in FIGS. 2, 3, 4, and 7 into the space S shown in FIG. 1 between two neighboring filtering plates 4 when the guide and lifting rails 12, 12A are lifted by the drive chains 11 and motor 13 or to return into the parking position when the rails 12, 12A are lowered as indicated by the arrows AR in FIGS. 2 and 7. It is preferred, as shown in FIG. 2, that the ramps RA are positioned outside the fabric 8 so as not to contact the fabric 8 but only the roller 6, as best seen in FIG. 3, or the carriages 10, 10A. Instead of permitting the rails 12, 12A to slightly shift horizontally for permitting the roller 6 or the carriages 10, 10A to roll up or down the ramps RA, it is possible to permit the carriages 10, 10A to move slightly laterally, namely with a horizontal motion component in the guide and lifting rails 12, 12A to be able to negotiate the ramp RA up or down when the lifting motion begins or the return motion ends. The ramps RA are also shown in FIGS. 5 and 6. Preferably, one ramp RA is provided at each end of the bracket 4B. The ramps are so dimensioned that sufficient parking space PS for the rollers 6, 7 is provided below the ramps RA on the bracket 4B, see FIGS. 5 and 6.

FIGS. 2 and 7 further show a cleaning pipe 17 with cleaning nozzles 17A preferably directed toward that surface of the fabric 8 which is exposed to the filter cake C shown, for example in FIGS. 4 and 5. The cleaning pipe 17 is preferably mounted with its ends in the carriages 10, 10A and is connected with one end to a flexible hose FH for the supply of cleaning fluid such as water under pressure. A flexible hose FH connects each cleaning pipe 17 to a common cleaning fluid supply pipe or duct 17B seen in FIG. 2. The pipe or duct 17B is secured to a bottom flange of the rail 12 and rides up and down with the rail 12. Each flexible hose FH is long enough and flexible enough to permit the horizontal movement of the corresponding filter plate 4 along the frame rails R when the filter plate package is opened and further, to permit the slight lateral movement of the corresponding carriages 10, 10A when they are passing the ramps RA. The cleaning fluid such as water is under a pressure sufficient for cleaning the filter fabric 8.

Referring to FIG. 8 the same components have been provided with the same reference numbers as described above and will not be again described. FIG. 8, shows ducts 14A through a neighboring filter plate 4M to feed the suspension SU to be filtered into the filter chamber FC formed between the two neighboring filtering plates 4M and 4'. These two plates close the filtering chamber during the filtering operation, whereby the filter fabric 8 is substantially resting against the bottom of the chamber in the filter plate 4 and the filtrate is collected along the bottom and removed through a collector duct 15A connected to the outlet port 15. A plurality of individual channels 15B may lead from the bottom of the filter chamber FC into the collector duct 15A.

FIG. 8 also shows the rollers 6 and 7 relative to one of the carriages 10A. There are two on-center spacings between the rotational axes of the rollers 6 and 7, namely a vertical on-center spacing VS and a horizontal on-center spacing HS. These spacings are preferably, but not necessarily, adjustable on the carriage in a horizontal adjustment range HAR and in a vertical adjustment range VAR. Preferably, each roller 6 and 7 is adjustable horizontally and vertically.

The adjustment will be made in the positioning of the rollers with regard to several considerations. One consideration is the space S between neighboring filter plates 4. That space should be minimized. Therefore, the horizontal spacing HS should be as small as possible. However, another consideration is the looping angle of the filter fabric 8 around the rollers 6 and 7. This looping angle depends on both the vertical spacing VS and on the horizontal spacing HS. The looping angle will be selected with due regard to the consistency of filter cake FC, because the effectiveness of the break-up of the filter cake depends on the looping angle. Routine experimentations will provide the most effective looping angle for any particular type of filter cake. The spacing VS and HS will also be selected with regard to the parking space provided by the horizontal width of the filter plates and by the respective brackets 4B. It should be noted that the filter cake break-up roller 7 is preferably placed approximately below the guide roller 6, so that the guide roller 6 is leading the break-up roller 7 when these rollers move in a working or break-up direction, e.g. upwardly.

Incidentally, the rollers 6, 7 with their spacings VS and HS are not shown to any scale. For example, in FIG. 9 the horizontal spacing of the two roller sets 18, 19 looks larger than the available parking space below the ramps RA1 and RA2. This optical impression is of no consequence. In an actual embodiment the roller sets will fit into the available parking space.

The operation of the present filter press FP will now be described with reference to FIGS. 3, 4, 5 and 6. In FIG. 3 the filter cake C collected in each of the filter chambers FC has reached a desired thickness. Before that thickness is achieved, the suspension is supplied simultaneously or sequentially under excess pressure into each of the chambers formed between two neighboring closed filter plates 4. The excess pressure is maintained sufficiently to cause the liquid phase of the suspension to pass through the filter fabric 8 in each chamber for collection and discharge through the outlet port 15. This operation is continued until the desired filter cake thickness is achieved. The supply of suspension is now stopped and pressurized air is introduced into the chamber through the inlets 14 for removing any suspension remainders. Once this is accomplished, the filter plate package is opened by operating the piston cylinder device 5, 5A, 5B to move the piston rod 5A and thus the pressure plate 2 to the right. The above mentioned spacer links 16 with their elongated holes 16A limit the maximum spacing S which will be sufficient for the filter cake removal.

Referring to FIG. 4, the filter fabric 8 which during the filtering operation lined the bottom of the filter chamber FC, is now sufficiently stretched to move the filter cake C into the spacing S. The two guide and lifting rails 12, 12A are now activated by switching the motor 13 on, whereupon the carriages 10, 10A and thus the rollers 6 and 7 travel up the ramps RA so that the carriages now also assume a position in the space S. Continued upward travel of the rails 12, 12A moves all carriages 10, 10A and thus all rollers 6 and 7 for all filter plates 4 in unison or in synchronism upwardly, whereby the S-configuration in the filter fabric 8 also travels upwardly as shown in FIG. 5, whereby the filter cake C is removed from the fabric 8 and falls downwardly in the direction of the arrow B into a collecting device not shown.

Once the rollers 6 and 7 have reached their uppermost position shown in FIG. 6 the entire cake has been removed. Now the cleaning fluid supply may be turned on to supply cleaning fluid to the pipes 17 through duct 17B and hoses FH, if needed and the downward movement of the rollers 6 and 7 begins by reversing the rotation of the motor 13, whereby all filter fabrics 8 of all filter plates 4 are cleaned simultaneously by their respective cleaning nozzles 17A. Once the rollers 6 and 7 have again reached the position shown in FIG. 4, the press FP will be ready for another filtering cycle after closing the filter plates 4 again by the operation of the piston cylinder device 5, 5A, 5B.

While the rollers 6 and 7 travel upwardly, the filter fabric 8 has the tendency to relax downstream of the rollers 6 and 7 as viewed in the upward travel direction, that is above the rollers. However, this relaxation tendency is counteracted or compensated by the above described tensioning device 9. Keeping the filter fabric 8 taut above and below the S-configuration is preferred because it facilitates the cake removal. Further, the S-configuration greatly facilitates the loosening of the filter cake from the filter fabric 8 due to the bending of the fabric around the rollers as they travel upwardly in a continuous manner and in synchronism with each other for all filter plates simultaneously.

As shown in FIG. 5, a scraper SC may be mounted on the carriages 10, 10A to extend across the required width of the filter fabric 8 to the extent covered by the cake C. The scraper SC also facilitates the separation between fabric 8 and filter cake C.

The cleaning of the fabric 8 on the surface that carried the filter cake C is completed when the rollers have reached their lowermost parking position as shown in FIG. 4. Next, the filter chamber FC is closed and then filled again with suspension under pressure through inlet ports 14A as shown in FIG. 8. This filling with suspension pushes the filter fabric 8 against the bottom of the filter chamber FC formed in the filter plate 4.

The spray nozzles 17A are activated only when it is necessary to clean or regenerate the filter fabric 8. Once the rollers 6 and 7 have reached their lowermost parking position, the filter press is ready for a new cycle which begins by moving the plates 4 against each other to the left in FIG. 1 to close the filter block of a plurality of filter plates 4 for a new filtering operation.

Referring further to FIG. 8 a modified filter plate 4M according to the invention may be used instead of the filter plates 4. The modification includes a flexible membrane FM mounted on the back side of the filter plate 4M to form a pressure chamber PC that can be pressurized through a pressure duct PD. A quick coupler QC permits connecting the duct PD to a source of fluid pressure for pushing the flexible membrane FM in the direction of the arrow P to squeeze the filter cake C in the filter chamber FC of the adjacent filter plate 4'.

Figure 9:
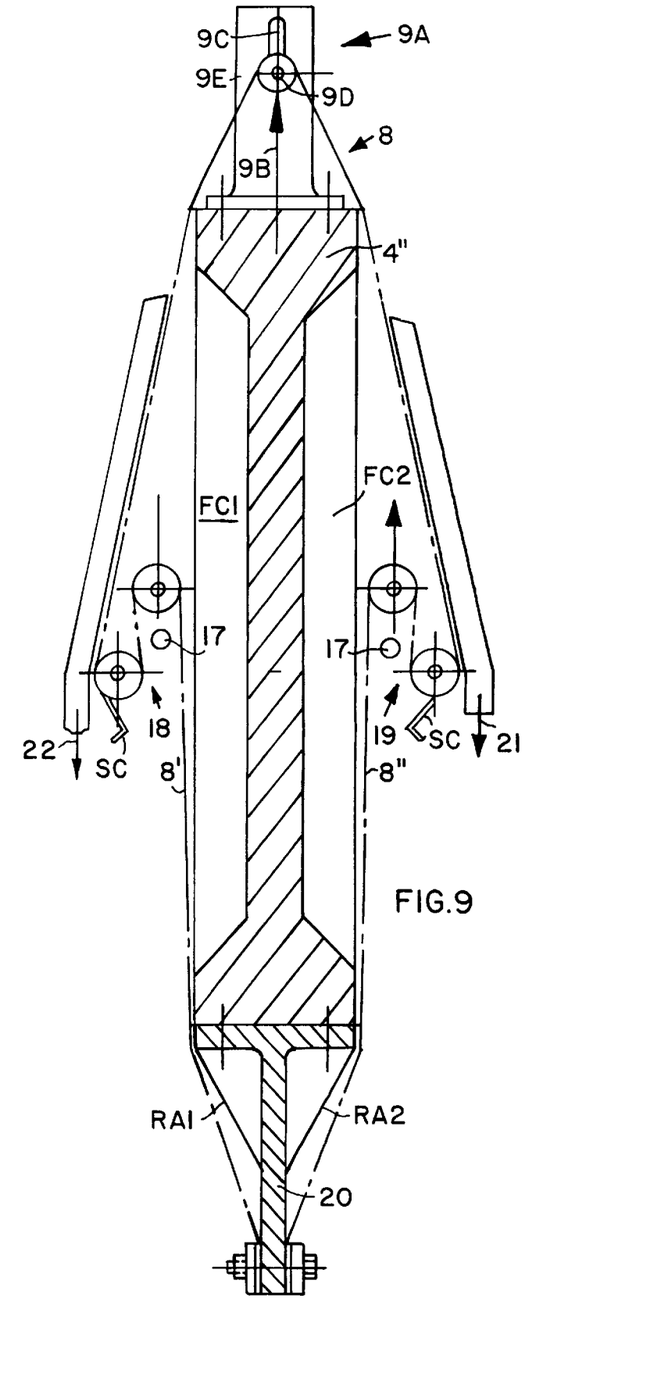
FIG. 9 shows a sectional view through a filter plate of a modified embodiment of the invention with two filter chambers and two respective filter cake removal devices.

FIG. 9 illustrates an embodiment in which each filter plate 4" forms two filter chambers FC1 and FC2. Two filter cake removal devices 18 and 19 according to the invention as described above are provided to cooperate with two filter fabric sections 8' and 8" of the filter fabric 8 that has two lower edges secured to a bracket 20 which in turn is secured to the lower edge of the filter plate 4". The bracket 20 preferably has a T-sectional configuration and provides two ramps RA1 and RA2 each of which functions as described above. The filter fabric 8 is folded back to form a loop around an elastic tensioning device 9A provided with a spring 9B merely indicated by an arrow to show that the spring urges a roller 9D upwardly. For this purpose the roller 9D is mounted with both its ends in respective elongated holes 9C of suspension brackets 9E which perform the same function as the suspension brackets 8H described above with reference to FIG. 3.

The embodiment of FIG. 9 functions in the same manner as described above with the added advantage that the available space is used still more efficiently and that upon completion of a filtering operation the filter cakes are held between two filter fabrics so that moving the filter plates 4" apart already tends to loosen the filter cake and tear it apart so that a filter cake portion remains on each filter fabric section. Even if the filter cake should remain entirely on one or the other filter fabric section, the operation of the filter cake removal devices 18, 19 will effectively remove the filter cake so that it falls down as indicated by the arrows 21 and 22 for collection in a bin or the like not shown.

Scrapers SC may also be provided in the embodiment of FIG. 9 for cooperation with each of the filter cake removal devices 18, 19 for further cleaning of the fabric as it passes around the rollers forming part of the devices 18, 19. A scraper SC may be provided for cooperation with one roller or the other roller, or each roller may be provided with its own scraper. Similar spray nozzles 17 may be positioned in the same way as described above.

An excess pressure of, for example, about 16 bar maintained by a conventional sludge pump, e.g. a piston membrane pump, is normally sufficient in the filtering chambers FC for urging the liquid phase through the filter fabric 8 and into the collector 15.

Although the invention has been described with reference to specific example embodiments, it will be appreciated that it is intended to cover all modifications and equivalents within the scope of the appended claims.

What is claimed is:

1. A filter press comprising a press frame (3), a pressure take-up plate (1) mounted in a fixed position in said press frame, a pressure application plate (2) movably mounted in said press frame, a power source (5) connected to said pressure application plate, a plurality of vertically oriented filter plates (4) mounted in said press frame in a space between said pressure take-up plate (1) and said pressure application plate (2) for horizontal movement toward and away from each other in response to an operation of said power source (5), each filter plate (4) having at least one filtering chamber (FC), one single layer filter fabric (8) secured to each of said filter plates (4) and covering said at least one filtering chamber (FC), a suspension inlet (14) for feeding suspension to be filtered into each of said filter chambers (FC) on one side of said filter fabric (8), an outlet (15) connected to each filtering chamber on an opposite side of said filter fabric (8) for discharging filtrate, a filter cake removing device for each single layer filter fabric (8), each filter cake removing device comprising a rotatable filter cake break-up roller (7) and a rotatable guide roller (6) positioned so that said guide roller (6) is leading said filter cake break-up roller (7) when said rollers (6, 7) are moving in a working direction, whereby said filter fabric (8) is looping around said two rotatable rollers (6, 7) for deforming said single layer filter fabric (8) in a zig-zag configuration, a lifting mechanism (H) connected to said two rotatable rollers (6, 7) for moving said zig-zag configuration along said single layer filter fabric (8) for removing a filter cake (C) from said single layer filter fabric (8), said filter cake removing device further comprising a cleaning pipe (17) with nozzles (17A), said cleaning pipe (17) being positioned between said two rotatable rollers (6, 7) for spraying a cleaning fluid onto a surface of said filter fabric (8) passing over said two rotatable rollers (6, 7) in said zig-zag configuration.

2. The filter press of claim 1, wherein each filter cake removing device comprises two lifting carriages (10, 10A), each of said two rotatable rollers (6, 7) having a first roller end mounted in one of said two lifting carriages and a second roller end mounted in the other of said two lifting carriages, and wherein said two lifting carriages are connected to said lifting mechanism (H).

3. The filter press of claim 1, further comprising a first holder (8B) securing a lower margin (8A) of said single layer filter fabric (8) to a respective lower end (4B) of a corresponding filter plate of said plurality of filter plates (4), a second holder (8D, 8E) securing an upper margin (8C) of said single layer filter fabric (8) to an upper end of said corresponding filter plate, and an elastically yielding tensioning mechanism (9) interposed between said second holder and said corresponding filter plate (4) for keeping said single layer filter fabric (8) taut.

4. The filter press of claim 3, wherein said tensioning mechanism comprises a number of springs (8I) urging said second holder (8E) upwardly to tension said filter fabric (8).

5. The filter press of claim 1, wherein said nozzles (17A) of said cleaning pipe (17) are arranged for directing a cleaning fluid onto a filter fabric surface of said single layer filter fabric (8) which has been carrying a filter cake formed on said single layer filter fabric (8) during a filtering operation.

6. The filter press of claim 1, further comprising two carriages (10, 10A) rotatably supporting said two rotatable rollers (6, 7), and wherein said cleaning pipe (17) is secured with one pipe end to one of said carriages and with the other pipe end to the other of said carriages for travelling along with said carriages and with said rotatable rollers, said nozzles (17A) being arranged in said cleaning pipe (17) in positions facing said filter fabric surface between said two rotatable rollers (6, 7).

7. The filter press of claim 1, wherein each filter plate (4) comprises a mounting bracket (4B) secured to a lower edge of said filter plate, said mounting bracket comprising a ramp (RA) for shifting said two rotatable rollers (6, 7) from a parking position below the respective filter plate (4) into an operating position next to said filtering chamber and vice versa.

8. The filter press of claim 1, wherein said lifting mechanism (H) comprises two lifting rails (12, 12A) extending horizontally and drive elements (11, 11A, 13, 13A, 13B, 13C) operatively connected to said lifting rails for lifting and lowering said rails (12, 12A), two lifting carriages (10, 10A) carrying said two rotatable rollers (6, 7), wherein said lifting carriages are mounted to said lifting rails (12, 12A) for operating all lifting carriages with the respective rollers (6, 7) in synchronism with each other.

9. The filter press of claim 1, wherein each filter plate comprises at least one suspension bracket (8H, SB) connected to an upper edge of each filter plate (4), and at least one suspension roller (4A) connected to said suspension bracket, said press frame comprising at least one horizontal upper rail (R) positioned above said filter plates (4), said suspension roller (4A) riding on said horizontal upper rail (R) during opening and closing said filter plates.

10. The filter press of claim 1, wherein said two rotatable rollers (6, 7) have longitudinal axes that are spaced from each other in the vertical and horizontal directions (VS, HS), and wherein at least one of said spacings (VS and/or HS) is adjustable for changing a looping angle of said filter fabric (8) around said rollers (6, 7) and thus said zig-zag configuration.

11. The filter press of claim 10, wherein said horizontal spacing (HS) is substantially zero so that said break-up roller (7) is positioned below said guide roller (6).

12. The filter press of claim 1, wherein said filter plates comprise a flexible diaphragm or membrane (FM), and a pressurizing chamber for admitting fluid under pressure to a side of said diaphragm or membrane (FM) opposite said filter chamber (FC) of the adjacent filter plate for squeezing a filter cake (C).

13. The filter press of claim 1, further comprising at least one scraper (SC) positioned for cooperation with at least one roller (6 and/or 7).

14. A filter press comprising a press frame (3), a pressure take-up plate (1) mounted in a fixed position in said press frame, a pressure application plate (2) movably mounted in said press frame, a power source (5) connected to said pressure application plate, a plurality of vertically oriented filter plates (4) mounted in said press frame in a space between said pressure take-up plate (1) and said pressure application plate (2) for horizontal movement toward and away from each other in response to an operation of said power source (5), each filter plate (4) having at least one filtering chamber (FC), one single layer filter fabric (8) secured to each of said filter plates (4) and covering said at least one filtering chamber (FC), a suspension inlet (14) for feeding suspension to be filtered into each of said filter chambers (FC) on one side of said filter fabric (8), an outlet (15) connected to each filtering chamber on an opposite side of said filter fabric (8) for discharging filtrate, a filter cake removing device for each single layer filter fabric (8), each filter cake removing device comprising a rotatable filter cake break-up roller (7) and a rotatable guide roller (6) leading said filter cake break-up roller (7) when moving in a working direction, whereby said filter fabric (8) is looping around said two rotatable rollers (6, 7) for deforming said single layer filter fabric (8) in a zig-zag configuration, a lifting mechanism (H) connected to said two rotatable rollers (6, 7) for moving said zig-zag configuration along said single layer filter fabric (8) for removing a filter cake (C) from said single layer filter fabric (8), wherein each filter plate (4) comprises a mounting bracket (4B) secured to a lower edge of said filter plate, said mounting bracket comprising at least one ramp (RA) for shifting said two rotatable rollers (6, 7)

from a parking position below the respective filter plate (4) into an operating position next to said filtering chamber and vice versa.

15. A filter press comprising a press frame (3), a pressure take-up plate (1) mounted in a fixed position in said press frame, a pressure application plate (2) movably mounted in said press frame, a power source (5) connected to said pressure application plate, a plurality of vertically oriented filter plates (4) mounted in said press frame in a space between said pressure take-up plate (1) and said pressure application plate (2) for horizontal movement toward and away from each other in response to an operation of said power source (5), each filter plate (4) having at least one filtering chamber (FC), one single layer filter fabric (8) secured to each of said filter plates (4) and covering said at least one filtering chamber (FC), a suspension inlet (14) for feeding suspension to be filtered into each of said filter chambers (FC) on one side of said filter fabric (8), an outlet (15) connected to each filtering chamber on an opposite side of said filter fabric (8) for discharging filtrate, a filter cake removing device for each single layer filter fabric (8), each filter cake removing device comprising a rotatable filter cake break-up roller (7) and a rotatable guide roller (6) leading said filter cake break-up roller (7) when moving in a working direction so that filter fabric (8) is looping around said two rotatable rollers (6, 7) for deforming said rollers (6, 7) in a zig-zag configuration, a lifting mechanism (H) connected to said two rotatable rollers (6, 7) for moving said zig-zag configuration along said single layer filter fabric (8) for removing a filter cake (C) from said single layer filter fabric (8), wherein each filter plate (4") comprises two filtering chambers (FC1, FC2), said single layer filter fabric (8) being positioned to cover both filtering chambers, wherein two of said filter cake removal devices arranged for detouring sections of said single layer filter fabric in respective zig-zag-configurations for removing a filter cake from each of said two filtering chambers when said filter cake removal devices are lifted by said lifting mechanism (H), wherein one filtering chamber of said two filtering chambers is arranged on one side of said filter plate (4") and the other filtering chamber is arranged on the opposite side of said filter plate, wherein said filter fabric is folded back upon itself to form a centerfold, said filter plate (4") comprising at its lower end a bracket (20) to which lower edges of said filter fabric are secured, and a guide roller (9D) mounted above an upper edge of said filter plate, said centerfold of said filter fabric resting on said guide roller (9D), and a tensioning device connected to said guide roller (9D) for elastically urging said guide roller upwardly to maintain said filter fabric in a taut condition.

16. The filter press of claim 15, wherein said tensioning device comprises tensioning springs (9B) urging said guide roller (9D) into a filter fabric elastically tensioning position.

17. The filter press of claim 15, wherein said bracket (20) has a T-cross-section including two ramps (RA1, RA2) formed as gussets in said T-cross-section for enabling said two filter cake removal devices (18, 19) to ride on said ramps out of or back into a parking position below said filter plate (4").

18. The filter press of claim 17, wherein said filter plate (4"), said bracket (20), said two filter cake removal devices (18, 19), said filtering chambers (FC1, FC2), said filter fabric (8) with its sections (8', 8"), and said guide roller (9D) are arranged mirror-symmetrically relative to a vertical plane passing centrally through said filter plate (4").

19. The filter press of claim 15, wherein said two rotatable rollers (6, 7) have longitudinal axes that are spaced from each other in the vertical and horizontal directions (VS, HS), and wherein at least one of said spacings (VS and/or HS) is adjustable for changing a looping angle of said filter fabric (8) around said rollers (6, 7) and thus said zig-zag configuration.

20. The filter press of claim 15, wherein said filter plates comprise a flexible diaphragm or membrane (FM), and a pressurizing chamber for admitting fluid under pressure to a side of said diaphragm or membrane (FM) opposite said filter chamber (FC) of the adjacent filter plate for squeezing a filter cake (C).

21. The filter press of claim 15, further comprising at least one scraper (SC) positioned for cooperation with at least one roller (6 and/or 7).

* * * * *